US006556254B1

(12) United States Patent
Palmero

(10) Patent No.: US 6,556,254 B1
(45) Date of Patent: Apr. 29, 2003

(54) BLACK AND WHITE LEVEL STABILIZATION

(75) Inventor: Augusto Palmero, Monza (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/379,193

(22) Filed: Aug. 2, 1999

(30) Foreign Application Priority Data

Aug. 27, 1998 (EP) ........................................... 98202845

(51) Int. Cl.[7] ............................ H04N 9/73; H04N 5/45; H04N 5/52; H04N 5/68

(52) U.S. Cl. ....................... 348/678; 348/655; 348/656; 348/380; 348/379; 348/657; 348/686

(58) Field of Search ................................ 348/678, 655, 348/656, 380, 379, 381, 382, 805, 691, 677, 377, 657, 690, 686, 184, 185, 189, 181, 679, 682; 315/383, 384

(56) References Cited

U.S. PATENT DOCUMENTS 4,370,674 A * 1/1983 Johnson et al. ............... 358/74
4,525,741 A * 6/1985 Chahal et al. .............. 358/212
4,566,798 A * 1/1986 Haas .......................... 356/448
4,769,703 A * 9/1988 Osborne et al. ............ 358/139
5,206,728 A * 4/1993 Kim .......................... 358/168
5,714,842 A * 2/1998 Krause et al. ................. 315/1
5,726,540 A * 3/1998 Klink ......................... 315/383
5,793,319 A * 8/1998 Ard ............................ 341/120
6,097,445 A * 8/2000 Goto et al. ................ 348/655
6,211,629 B1 * 3/2001 Teuling et al. .............. 315/383
6,226,047 B1 * 5/2001 Ryu ........................... 348/569
6,281,943 B1 * 8/2001 Kim ........................... 348/656

FOREIGN PATENT DOCUMENTS

JP 514935 1/1993 .......... H04N/17/04

OTHER PUBLICATIONS

"TDA4885—150 MHz video controller with I$^2$C–bus", Philips Semiconductors, Nov. 25, 1997.

* cited by examiner

*Primary Examiner*—John Miller
*Assistant Examiner*—Paulos Natnael
(74) *Attorney, Agent, or Firm*—Edward W. Goodman

(57) ABSTRACT

In a black and white level stabilization device, an OSD signal generator (OSD-SG) generates black and white reference signals (OSD-R/G/B), amplifying circuits (VA-R/G/B) amplify the black and white reference signals (OSD-R/G/B) or RGB signals (Ri, Gi, Bi), and a measuring circuit (PNP-R/G/B, $R_M$), coupled to the amplifying circuits (VA-R/G/B), measures a white level and a black level in response to the black and white reference signals (OSD-R/G/B).

2 Claims, 2 Drawing Sheets

BLACK AND WHITE LEVEL STABILIZATION

BACKGROUND OF THE INVENTION

1. Field of the Invention

The invention relates to a device for black and white level stabilization, and to a display apparatus comprising such a device.

2. Description of the Related Art

In a CRT, the relation between the beam current and the light output is linear, so that an indirect information of the light intensity can be obtained by measuring the current values of the three cathodes for the R, G and B signals. The value of the current for each beam normally ranges from black to peak white. The black level is set by adjusting the cut-off values with the default (minimum) brightness level and without any video signal input. This current level is near to the zero emission (raster). The white level is set by adjusting the gain values of the three RGB channels with the default (maximum) contrast level and the maximum video signal input, in order to get the correct white temperature and light output. Both the black and the white levels are obtained by setting the cathode voltages.

During the lifetime of the CRT, the cathode efficiency decreases, so the settings of the tube are not correct anymore. The voltage/current characteristic of the cathodes changes causing a dark level shift and an error in the color temperature and in white level. In addition, a temperature drift causes errors in light emission.

SUMMARY OF THE INVENTION

The target of the Black and White Level Stabilization (BWLS) feature is to restore the original values of the current of the three beams by re-adjusting the cut-off and white voltages, in order to correct the light emission and the color deviations. To this purpose, the beam current values are measured at the end of the factory adjustments for the cut-off and white for each color temperature, then these reference values are stored in the monitor EEprom. When the BWLS adjustment routine is started, the actual beam current values are compared with the reference values and, if different, actions are taken to restore the original settings. Since the current measurement, especially for the white, must be carried out during the video active signal the BWLS routine must be recalled by means of a special command when the user decides to do it. This command can be an item of the On-Screen Display (OSD) menu. In order to realize the black and white level stabilization, a black/white pattern generator is needed inside the monitor.

It is, inter alia, an object of the invention to provide a very simple black and white level stabilization. To this end, a first aspect of the invention provides a device as for black and white stabilization. A second aspect of the invention provides a display apparatus incorporating such a black and white stabilization device.

In a black and white level stabilization device in accordance with a primary aspect of the invention, an OSD signal generator generates black and white reference signals, amplifying circuits amplify the black and white reference signals or RGB signals, and a measuring circuit, coupled to the amplifying circuits, measures a white level and a black level in response to the black and white reference signals.

These and other aspects of the invention will be apparent from and elucidated with reference to the embodiments described hereinafter.

DESCRIPTION OF THE PREFERRED EMBODIMENT

Figure 1:
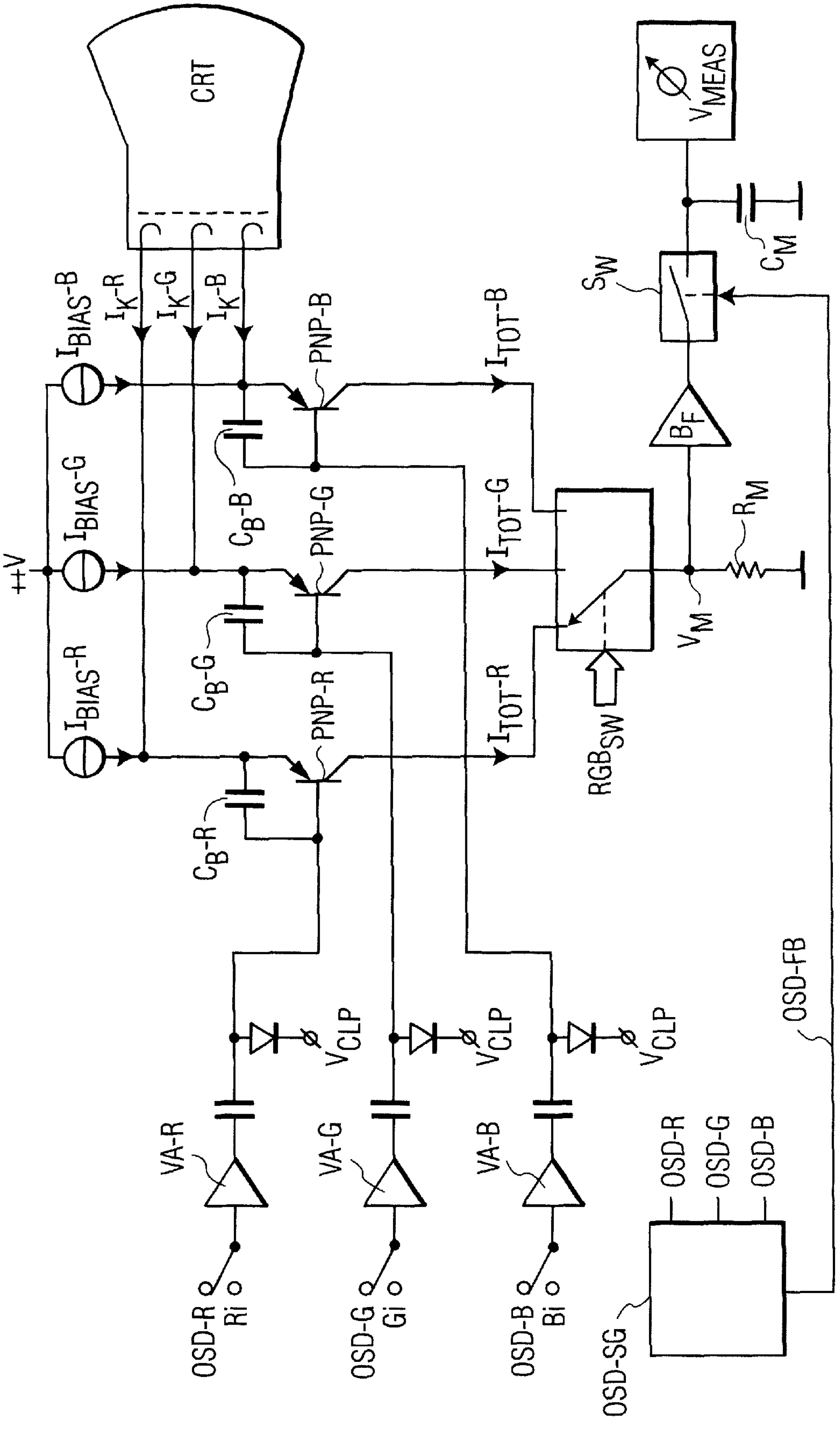
FIG. 1 shows an embodiment of a display apparatus in accordance with the present invention.

By using the OSD signals from an OSD signal generator OSD-SG, no additional hardware is needed to generate the proper black or white pattern for measurements. The added hardware is only a simple circuit to measure the current of the three cathodes and a sample-and-hold circuit. Three OSD RGB signals OSD-R, OSD-G and OSD-B are used to generate a black/white box in the middle of the screen, while an OSD fast blanking signal OSD-FB is used to sample the cathode current measurement. A $\mu$P, present in the monitor, then processes the result of the measurement and shifts the factory adjusted cathode voltages and the video gains in order to reach the final result. The above can be obtained under the following conditions:

- the RGB signals of the OSD must track the video gains, in order to have the same color temperature for the OSD and the video signal; and
- the video input Ri/Gi/Bi has to be switched off during the measurements, because it may alter the measured values; only the OSD signals must be sent through the video path.

The video preamplifier TDA4885 allows this features; the first circuit for the test has been realized. It has been modified to match the added hardware and to manage the needed signals for the measurements. This is the simplest and cheapest way to reach the result.

To detect the cathode current, a small signal PNP transistor PNP-R/G/B has been inserted in the video path between a final video amplifier VA-R/G/B and a cathode of a cathode ray tube CRT. In this way, the cathode current $I_K$-R/G/B is redirected towards a measurement resistor $R_M$. As a consequence, a voltage value across the measurement resistor $R_M$ is directly proportional to the cathode current $I_K$-R/G/B. The insertion of the transistor PNP-R/G/B causes, on one hand, a very negligible loading effect, but, on the other hand, it introduces a smearing distortion on the video signal, because of the cathode capacity. To overcome this drawback, a bypass capacitor $C_B$-R/G/B has been inserted to bypass the transistor PNP-R/G/B during high-speed transitions of the video signal. The cathode current $I_K$-R/G/B can be considered as a sum of a beam current $I_{BEAM}$-R/G/B and a leakage current $I_{LEAKAGE}$-R/G/B. Only the first one produces light on the screen. The second one can be caused by the high voltage applied to the tube and can be positive or negative. That means the cathode current $I_K$-R/G/B can flow in a reverse way through the transistor PNP-R/G/B during the black and ultra-black areas of the screen, making the circuit not working. To avoid this, a bias current $I_{BIAS}$-R/G/B is added to the cathode current $I_K$-R/G/B to make the total current $I_{TOT}$-R/G/B always positive. The value of the leakage current $I_{LEAKAGE}$-R/G/B and the bias current $I_{BIAS}$-R/G/B is large enough to affect the cut-off measurement, therefore it must be taken in account.

The total current $I_{TOT}$-R/G/B can be written:

$$I_{TOT}=I_{BIAS}+I_{LEAKAGE}+I_{BEAM} \tag{1}$$

and the voltage $V_M$ of the current detector circuit is:

$$V_M = R_M * I_{TOT} \quad (2)$$

The voltage $V_M$ is sent to the sampling circuit via a buffer $B_F$; its value is sampled by means of an analog switch $S_W$ and held by a capacitor $C_M$. The sampling signal is formed by the OSD Fast Blanking signal OSD-FB; this means that the voltage value is sampled in correspondence of the OSD box on the screen. The sample-and-hold circuit preserves the measured value between the consecutive horizontal lines and the vertical video frames, to allow a correct measurement.

Figures 2A, 2B, 2C:
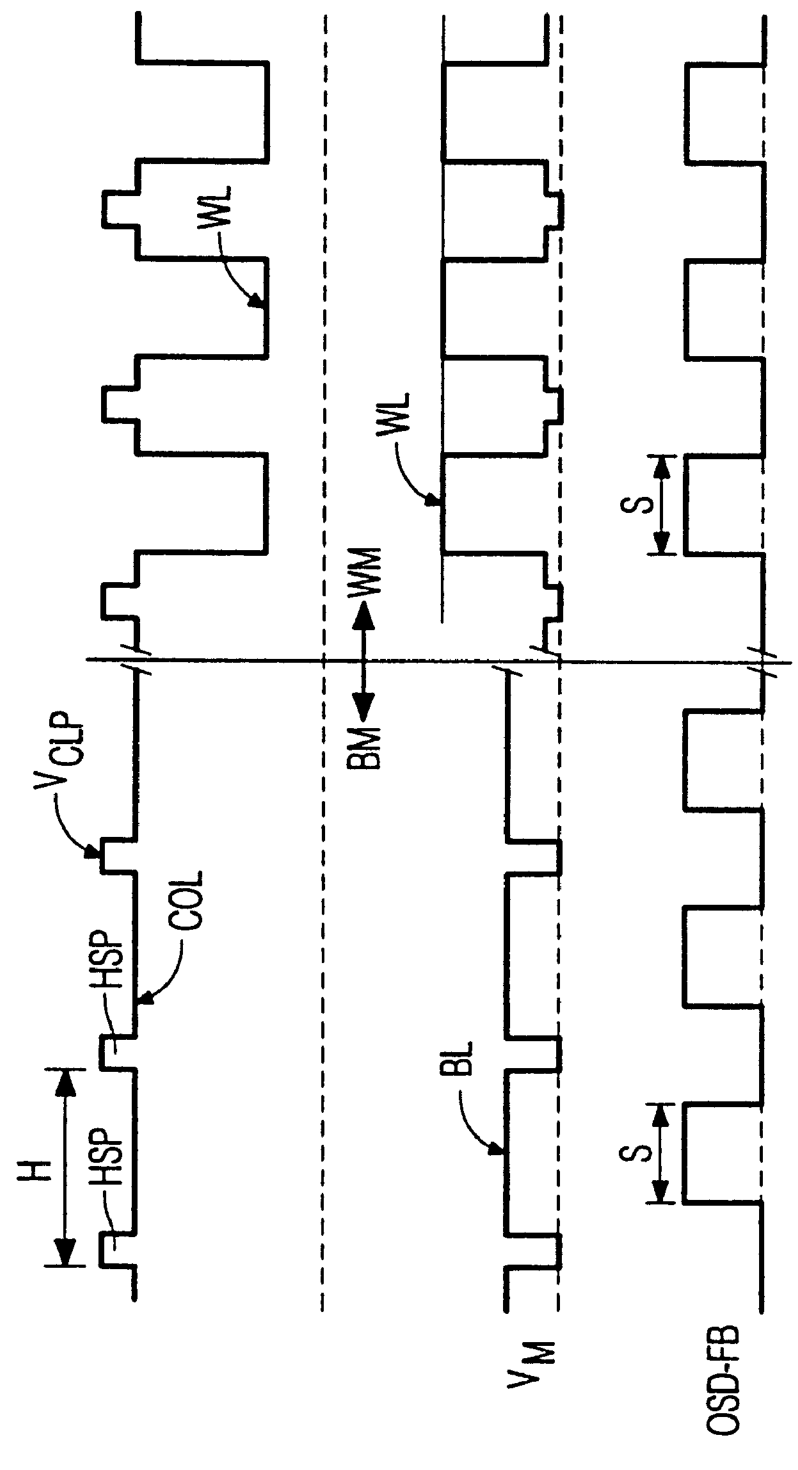
FIGS. 2A–2C shows a timing diagram relating to the embodiment of FIG. 1.

The timing diagram of FIGS. 2A–2C shows the operation of the measuring circuit. H indicates a horizontal period between two horizontal synchronizing pulses HSP. At the left-hand side of the dotted line, black measurement BM is shown, while at the right-hand side of the dotted line, white measurement WM is shown. FIG. 2A shows the CRT video signal, FIG. 2B shows the detected voltage $V_M$, and FIG. 2C shows the OSD fast blanking signal OSD-FB controlling the sampling periods S. Note that the video signal on the CRT cathodes is clamped at the clamp level $V_{CLP}$ and the cut-off regulation moves this value. The true cut-off level COL is given by adding the default brightness value and, eventually, the so-called pedestal blanking.

The measuring circuit, shown as $V_{MEAS}$ in FIG. 1, is made up, in principle, by an analog-to-digital converter, which gives the information of the measured voltage to the $\mu$P. In practice, it has been realized by a comparator driven by a DAC included in the $\mu$P itself. The current measurements must be carried out, of course, for all the three guns of the tube. The circuit comprising the bias current generator and the PNP transistor is obviously tripled, while the sample-and-hold circuit is switched between the three signals. The switch $RGB_{SW}$ switches the current path coming from the R, G or B gun to the measuring resistor $R_M$. This switch is 12C-bus driven by the $\mu$P during the black and white level stabilization (BWLS) adjustment. When the BWLS procedure is started, the following steps are performed:

1st step: leakage and bias current measurement. For this purpose, the video signal is switched off and the screen of the CRT is blanked by driving the grid G1 of the tube to a very negative voltage so that the only leakage current flows trough the cathode. The blanking signal for the grid G1 is normally available in a monitor as a $\mu$P output. The values of the Brightness, Contrast and OSD-contrast are set to a default value, while the keyboard is disabled. An OSD black box is opened in order to make the signals available for the measurements. The detected voltage is sampled, measured and stored in the $\mu$P memory. Let's call $V_{BIAS+LEAKAGE}$ the found value.

2nd step: black level adjustment (cut-off). The grid G1 is restored to the nominal voltage while the video signal is kept off, so only the raster is visible on the screen. The total cathode current is measured in correspondence of the OSD black box (getting the value $V_{TOT}$), and then the previous found value is subtracted to obtain only the cut-off component. Looking at the above equations (1) and (2), we can write:

$$I_{CUT\text{-}OFF} = I_{TOT} - (I_{BIAS} + I_{LEAKAGE})$$

and then:

$$V_{CUT\text{-}OFF} = V_{TOT} - V_{BIAS+LEAKAGE}$$

The measured value is then compared with the black reference level stored in the monitor EEprom during the factory adjustment; if different, the cut-off of the tube is changed and the step 2 is repeated until the two values are equal. The value of the cut-off current is set very close to zero, but it cannot really be zero otherwise the control loop becomes non-linear and the system loses the control across the zero current value.

3rd step: white level adjustment. A white OSD box is opened in the middle of the screen, and the cathode current is measured, getting the value $V_{WHITE}$. Due to the very different value of the black and leakage currents (some microamperes) with respect to the white current (some hundreds of microampere), the value of the resistor $R_M$ is changed to reduce the resulting voltage between the correct range limits. The measured value is compared with the white reference level, stored in the monitor EEprom during the factory adjustment and, if different, the video gain is changed and the step 3 is repeated until the white level reaches the reference level.

The steps above are repeated for each of the three guns of the tube. At the end of the procedure, the normal video signal, brightness and contrast are restored and the keyboard is re-enabled. The whole procedure takes only few seconds. To make the operation more impressive to the user, OSD messages like "adjusting black, please wait . . . " and so on can be shown on the screen between the various steps (but not during the measurements, of course).

The BWLS adjustment procedure should be, in general, manually started when the user decides to make use of it. An item has been added to the OSD menu for this reason: by clicking on it, the whole procedure is carried out. An automatic procedure can be inserted if desired. For example, the adjustment can start automatically each minute after the monitor is switched on, for the first five minutes, then each quarter of hour within the first working hour. Anyway the user must have the possibility of deselecting the automatic procedure, because it could be sometime disagreeable. The availability of the automatic procedure depends only by the monitor firmware.

The reference values for the black and the white levels must be stored in the monitor EEprom during the factory adjustment of the color temperatures. Just after having adjusted the cut-off level and the RGB gains to obtain the chosen white color temperature at the default timing and resolution, an automatic procedure must be carried out to store the reference values for this temperature. This procedure can be started by sending a particular command code from the factory test equipment to the monitor and must be repeated for each factory color temperature. The monitor firmware recognizes this code and activates the BWLS procedure, but only to measure the current reference values and to store them in the EEprom.

A primary aspect of the invention can be summarized as follows. The black level and the white color temperatures in a monitor CRT are strongly dependent on the aging and the temperature of the tube itself, especially during the warm-up time after the power-on. Purpose of the "Black and White Level Stabilization" feature is to achieve stable levels of light emission, both for the black (cut-off) and the white screen emission during the CRT life. In order to realize it, a black/white pattern generator is needed inside the monitor. Aim of the invention is the use of the signals of an OSD device (normally present in a monitor) as a pattern generator, which allows implementing a very simple circuitry to adjust the levels, getting the result of simplifying the additional hardware and achieving significant cost saving to realize the feature.

It should be noted that the above-mentioned embodiments illustrate rather than limit the invention, and that those skilled in the art will be able to design many alternative embodiments without departing from the scope of the appended claims. The Word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A method for performing black and white level stabilization in a display device having an On-Screen Display signal generator, said method comprising the steps:

generating black and white reference signals using said On-Screen Display signal generator;

amplifying said black and white reference signals; and measuring a white level and a black level in said display device in response to the black and white reference signals.

2. The method as claimed in claim 1, wherein said method further comprises:

generating a sampling signal using said On-Screen Display signal generator, wherein said measuring step is performed at periods indicated by said sampling signal.

* * * * *